United States Patent
Hsu et al.

(10) Patent No.: US 7,394,216 B2
(45) Date of Patent: Jul. 1, 2008

(54) AUTOMATIC ANTI-TRAP DEVICE

(75) Inventors: Yu-Chia Hsu, Taoyuan Hsien (TW); Te-Yang Shen, Taoyuan Hsien (TW); Ming Yeh, Taoyuan Hsien (TW); Yuan-Ying Yu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 51 days.

(21) Appl. No.: 11/448,011

(22) Filed: Jun. 7, 2006

(65) Prior Publication Data

US 2007/0057644 A1 Mar. 15, 2007

Related U.S. Application Data

(63) Continuation-in-part of application No. 11/298,577, filed on Dec. 12, 2005.

(30) Foreign Application Priority Data

Sep. 14, 2005 (TW) ............................... 94131661 A
May 17, 2006 (TW) ............................... 95117539 A

(51) Int. Cl.
*G05B 5/00* (2006.01)

(52) U.S. Cl. .................. 318/469; 318/468; 318/472; 318/473; 318/476; 318/477

(58) Field of Classification Search ............... 318/469, 318/468, 472, 473, 476, 477, 280
See application file for complete search history.

(56) References Cited

U.S. PATENT DOCUMENTS

| 5,530,329 A * | 6/1996 | Shigematsu et al. ......... 318/469 |
| 5,592,777 A * | 1/1997 | Petri et al. ..................... 49/28 |
| 2004/0178758 A1* | 9/2004 | Shinohara .................. 318/469 |

* cited by examiner

*Primary Examiner*—Karen Masih
(74) *Attorney, Agent, or Firm*—Muncy, Geissler, Olds & Lowe, PLLC

(57) ABSTRACT

An automatic anti-trap device is provided to add safety to other apparatuses. The automatic anti-trap device of this invention has a driving circuit to control a motor, a current sensor to generate a current signal, a current ripple peak value circuit to generate a current ripple peak value signal according to the current signal, and a micro processor to generate a working signal for the driving circuit to control the motor according to a keystroke signal, the current signal and the current ripple peak value signal.

15 Claims, 6 Drawing Sheets

AUTOMATIC ANTI-TRAP DEVICE

RELATED APPLICATIONS

This application is a continuation-in-part of U.S. application Ser. No. 11/298,577, filed Dec. 12, 2005, which claims priority to Taiwan Application Serial Number 94131661, filed Sep. 14, 2005, currently pending. The present application is also based on, and claims priority from Taiwan Application Serial Number 95117539 filed May 17, 2006. All of these applications are incorporated herein by this reference.

BACKGROUND OF THE INVENTION

1. Field of the Invention

The present invention relates to an automatic anti-trap device, and especially relates to an automatic anti-trap device used on the power window of an automobile.

2. Brief Description of the Related Art

Transmissions comprised of a motor, gear module or screw are often used in daily life. These transmissions can facilitate such items as the power windows of an automobile, power gates, roller gates and conveyers. This kind of transmission has high output force and low power consumption to move a heavy object. But when the transmission works abnormally, such as when trapping an object or becoming blocked, the transmission is easily damaged and the trapped object is easily injured. Unless a person stops the transmission motion, the typical transmission, which does not have an automatic anti-trap device, can injure a person or damage an object by its high output force.

FIG. 1 is a functional block diagram of the automatic anti-trap device according to a prior art. This automatic anti-trap device comprises a micro processor 150, a driving circuit 130 and a position sensor 120. The driving circuit 130 and the position sensor 120 couple to the micro processor 150, and the driving circuit 130 and the position sensor 120 couple to the motor 110 separately. Furthermore, the micro processor 150 couples to a memory 170 to store the processed data. The motor 110 moves a window 199 (such as power window of an automobile) by coupling to a gear module 190. The micro processor 150 uses the position signals detected by the position sensor 120 to get time intervals and torques of the motor and compares the intervals and torques with the interval threshold value and torque threshold value stored in micro processor 150. When the time interval or torque is greater than the threshold values, the automatic anti-trap device stops or reverses the motor 110.

However, as time goes by, the physical condition of the device changes as the motor or machine ages. Hence, this kind of automatic anti-trap device easily exhibits error in action unless its threshold values are updated accordingly.

FIG. 2 is a functional block diagram of the automatic anti-trap device according to another prior art, which is different from that shown in FIG. 1 in that the position sensor 220 and the proximity sensor 225 of FIG. 2 are set at the border of the window 199 rather than coupled to the motor 110. The micro processor 250 makes logical judgments according to the information from position sensor 220 and the proximity sensor 225. This kind of device has an advantageous simple algorithm but is disadvantaged in that establishing the sensors and circuits at the border of the window 199 is difficult to design and costly to produce.

Therefore, an automatic anti-trap device is needed with updatable threshold values and is easily maintained and inexpensive to improve the transmission safety.

SUMMARY OF THE INVENTION

It is an objective of the present invention to provide an automatic anti-trap device.

It is another objective of the present invention to provide an automatic anti-trap device that is easily maintained and inexpensive.

It is another objective of the present invention to provide an automatic anti-trap device exhibiting safety, sensitivity and stability.

It is another objective of the present invention to provide a method of operating an automatic anti-trap device.

In accordance with the foregoing objectives, an embodiment of this invention provides an automatic anti-trap device. The automatic anti-trap device is provided to add safety to other apparatuses. The automatic anti-trap device of this invention comprises a driving circuit to control a motor, a current sensor to generate a current signal, a current ripple peak value circuit to generate a current ripple peak value signal according to the current signal, and a micro processor to generate a working signal for the driving circuit to control the motor according to a keystroke signal, the current signal and the current ripple peak value signal.

An embodiment of this invention further comprises a current ripple peak value circuit. The current ripple peak value circuit is used to generate a current ripple peak value signal according to the current signal. The micro processor can compute a position of the window according to the current ripple peak value signal and judge whether the window is at an anti-trap zone for generating the working signal according to the current signal or the period of current ripple between peaks.

The micro processor of this embodiment can update threshold values of this automatic anti-trap device to avoid erroneous actions caused by usage wear. Moreover, these sensors (the current sensor and the current ripple peak value circuit) do not need to be established at the border of the window; this automatic anti-trap device is thus easy to maintain and inexpensive.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention can be more fully understood from the following detailed description and the accompanying drawings, which are given by way of illustration only, and thus are not limitative of the present invention, and wherein.

DETAILED DESCRIPTION OF THE PREFERRED EMBODIMENT

Figure 1:
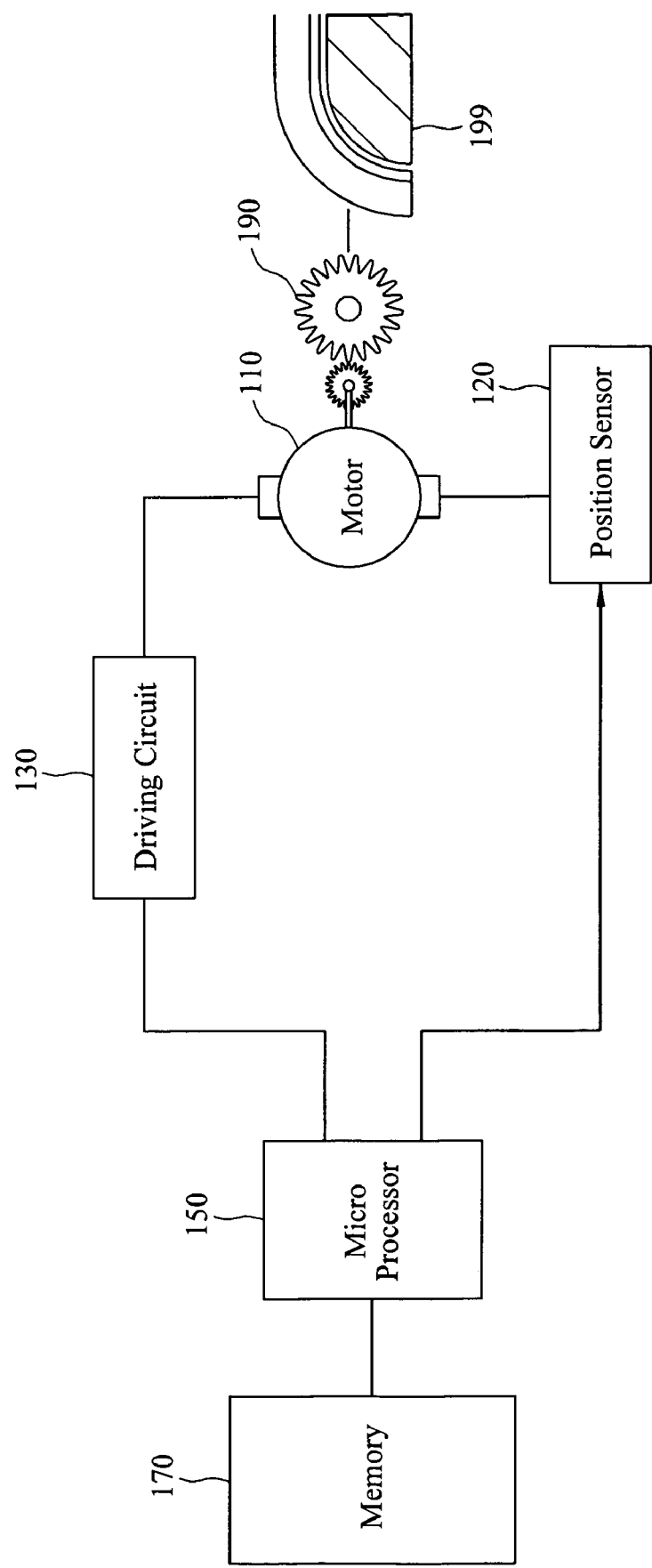
FIG. 1 is a functional block diagram of the automatic anti-trap device according to a prior art.
Figure 2:
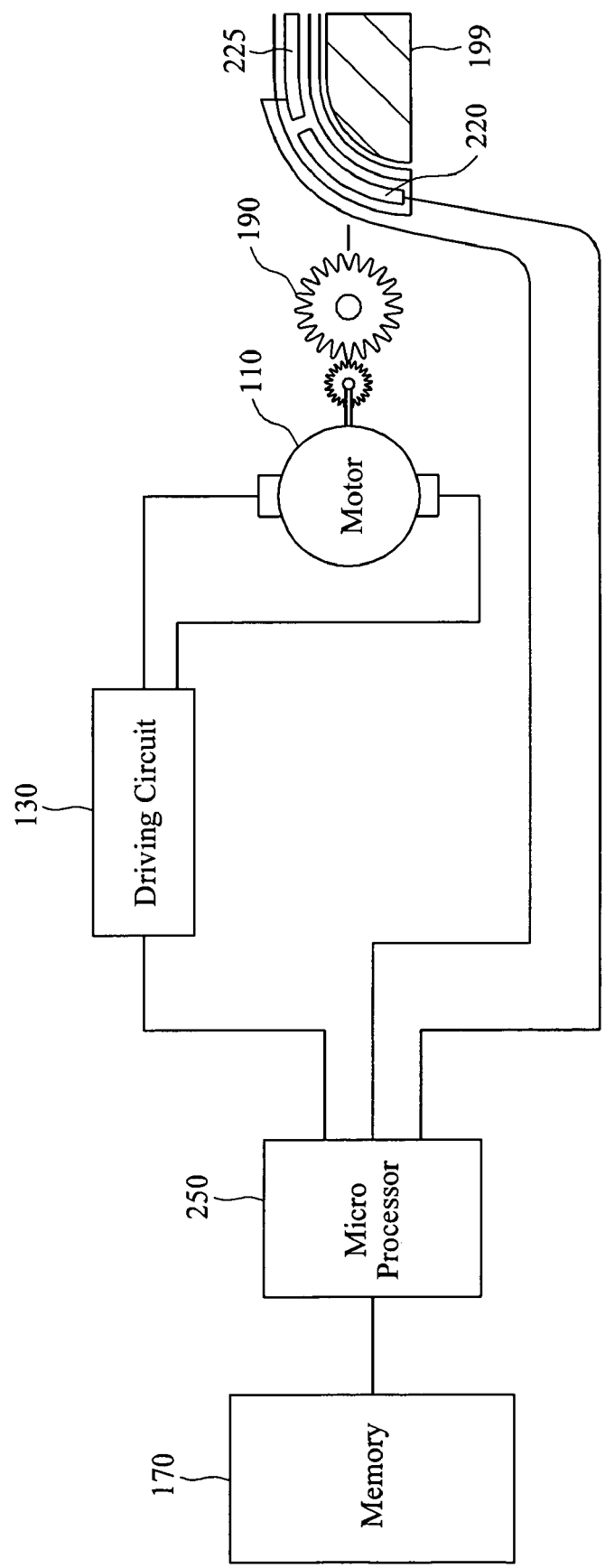
FIG. 2 is a functional block diagram of the automatic anti-trap device according to another prior art.

Reference will now be made in detail to the present preferred embodiments of the invention, examples of which are illustrated in the accompanying drawings. Wherever possible, the same reference numbers are used in the drawings and the description to refer to the same or like parts.

Figure 3:
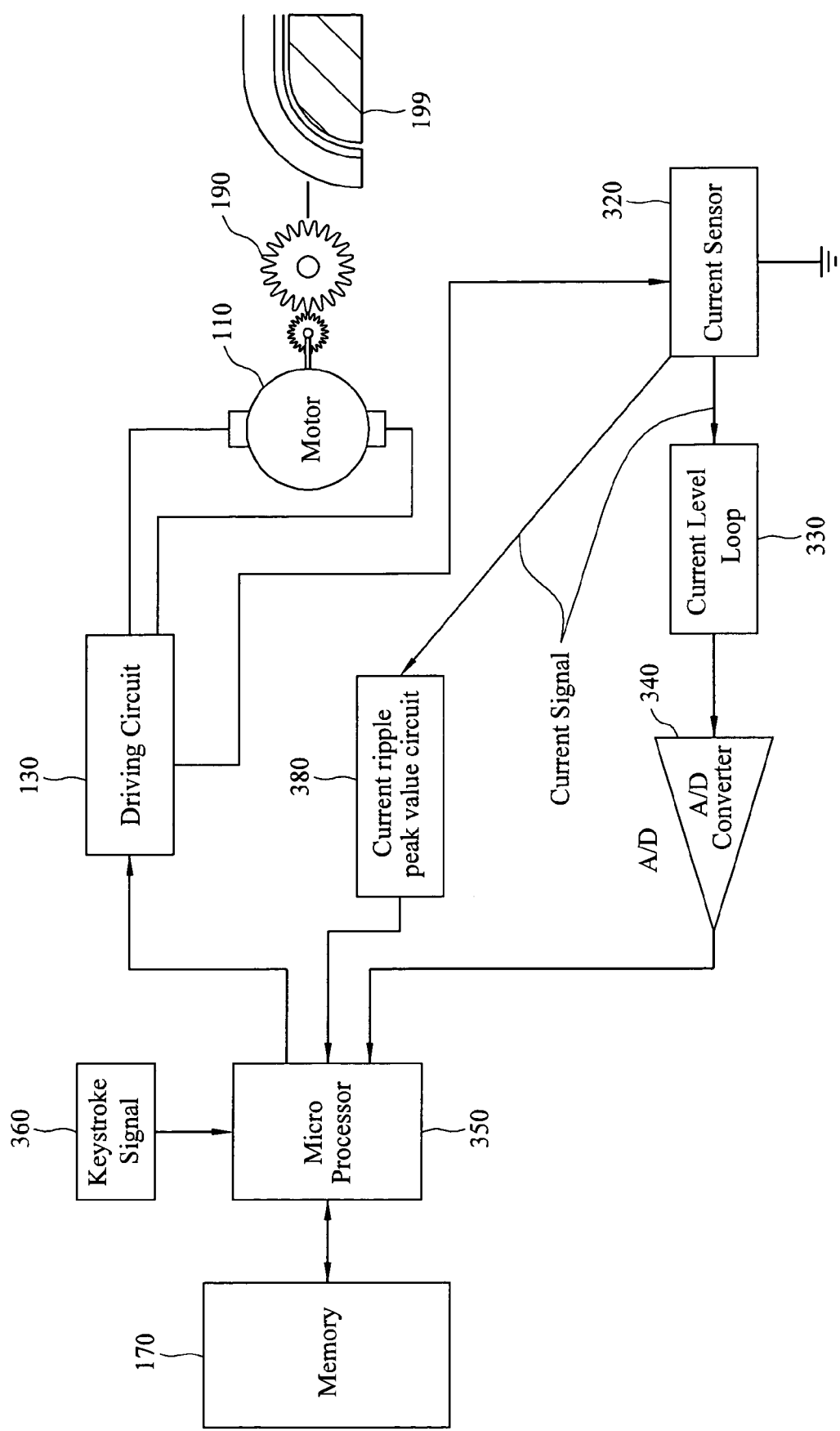
FIG. 3 is a functional block diagram of the automatic anti-trap device according to one preferred embodiment of this invention.

FIG. 3 is a functional block diagram of the automatic anti-trap device according to one preferred embodiment of this invention. This embodiment can detect the position of the window to judge whether the window is at an anti-trap zone. This automatic anti-trap device comprises a micro processor 350, a driving circuit 130, a current sensor 320 and a current ripple peak value circuit 380. The driving circuit 130 and the current ripple peak value circuit 380 are coupled to the micro processor 350 separately. The driving circuit 130 is coupled to a transmission (such as motor 110) and the current sensor 320. Furthermore, the micro processor 350 couples to a memory 170 to store the processed data and handles a keystroke signal. The motor 110 moves a window 199 by coupling to a gear module 190.

The output end of the current sensor 320 connects to the input end of the current ripple peak value circuit 380. The current sensor 320 generates a current signal for the micro processor 350 and the current ripple peak value circuit 380. The current signal varies with changing current of the driving circuit 130, brush, gear module or screw. Thus, the current ripple peak value circuit 380 can generate a current ripple peak value signal by the varied current signal. Meanwhile, the micro processor 350 uses the current signals from the current sensor 320 to get a normal current signal.

When an accident occurs (such as trapping an object), the current is abnormal by the abnormal torque of the motor 110. The abnormal current changes the current signal. A first threshold value and a second threshold value of the current signal or period of current ripple are determined from the normal current signal or normal peak-to-peak period of current ripple, wherein the second threshold value is greater than the first threshold value (such as the first threshold value set to be 10% greater than the normal current signal or normal period of current ripple, and the second threshold value set to be 30% greater than the normal current signal or period of normal current ripple). These two threshold values are updateable to reduce the erroneous actions caused by aging machines. The micro processor 350 gets a position of the window 199 after processing the current ripple peak value signal (such as by counting the number of the current ripple peak value signals). Therefore, the micro processor 350 compares the information of the position with the preset information of an anti-trap zone and judges whether the window is at the anti-trap zone.

When the current signal is analog type, the embodiment of this invention further comprises an analog to digital converter 340 coupled between the current sensor 320 and the micro processor 350. The analog to digital converter 340 is used to transform an analog signal into a digital signal for the micro processor 350. Moreover, the micro processor 350 can compute different first threshold values and second threshold values by different positions to get more precise threshold values.

Furthermore, suitable filters can be used in the current ripple peak value circuit 380 to eliminate the noise of the current ripple peak value signal, such as a high pass filter, a low pass filter, a band pass filter, a band rejection filter or a notch filter. Wherein the high pass filter can be configured at the input end of the current ripple peak value circuit 380. Thus, the high pass filter can prevent the current ripple peak value circuit 380 detecting error ripple peak value caused by the rush start-up current generated by the motor 110. Otherwise, a hysteretic comparator can be used in the current ripple peak value circuit 380 to eliminate the noise of the current ripple peak value signal. Meanwhile, a signal amplifier or a signal attenuator can be used in the current ripple peak value circuit 380 to control the amplitude of the current ripple peak value signal in an acceptable range.

Figure 3A:
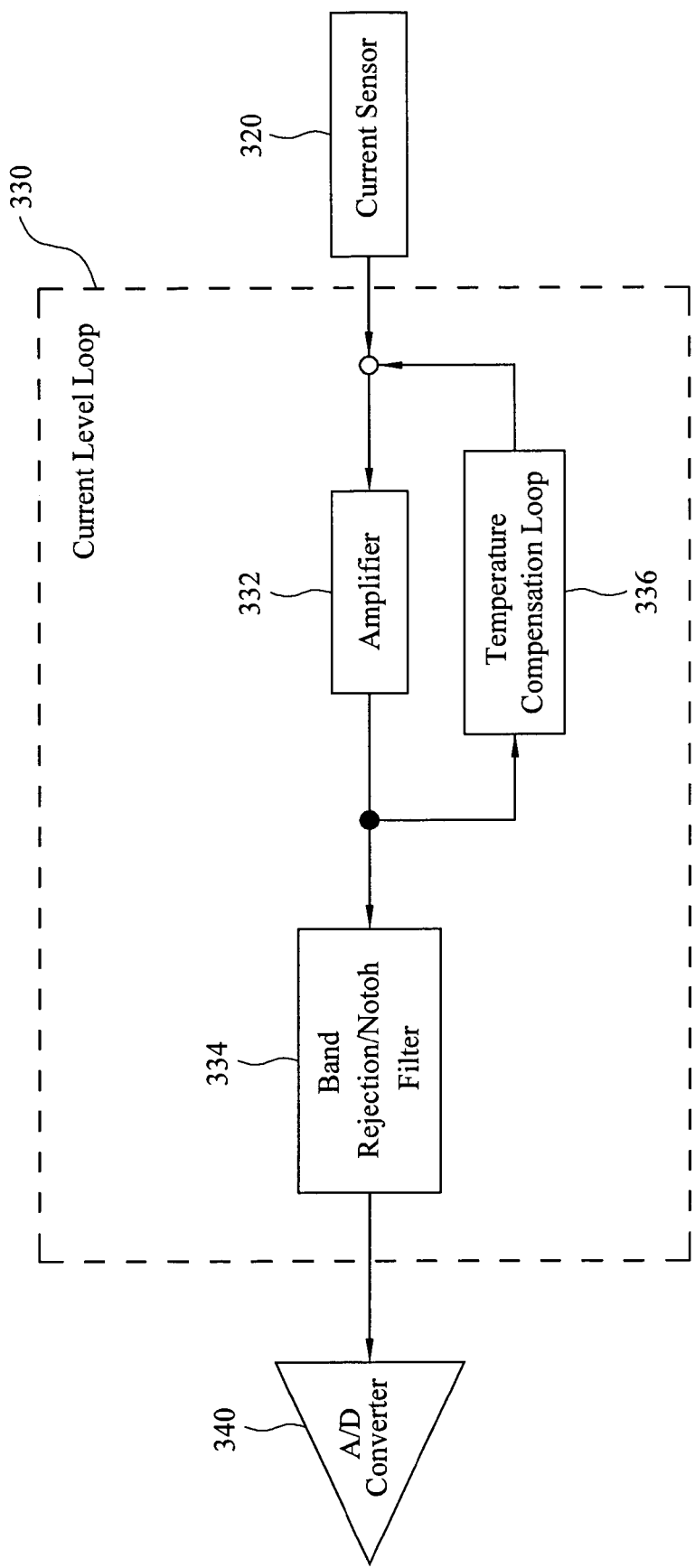
FIG. 3A is a functional block diagram of a current level loop according to one preferred embodiment of this invention.

FIG. 3A is a functional block diagram of a current level loop according to one preferred embodiment of this invention. The automatic anti-trap device further comprises a current level loop 330 connected between the current sensor 320 and the analog to digital converter 340. The current level loop 330 is arranged to control the amplitude of the current signal in an acceptable range. The current level loop 330 has an amplifier 332 to control an inside signal of the current level loop 330 in an acceptable range. Otherwise, the current level loop 330 has a band rejection filter (or a notch filter) 334 to eliminate the noise of the current signal. When there are other factors influencing the current level loop 330, a compensation loop can be used to adjust. For example, when temperature influences the current level loop 330, a temperature compensation loop 336 can be used in the current level loop 330 to eliminate the influence of the temperature.

Figure 4:
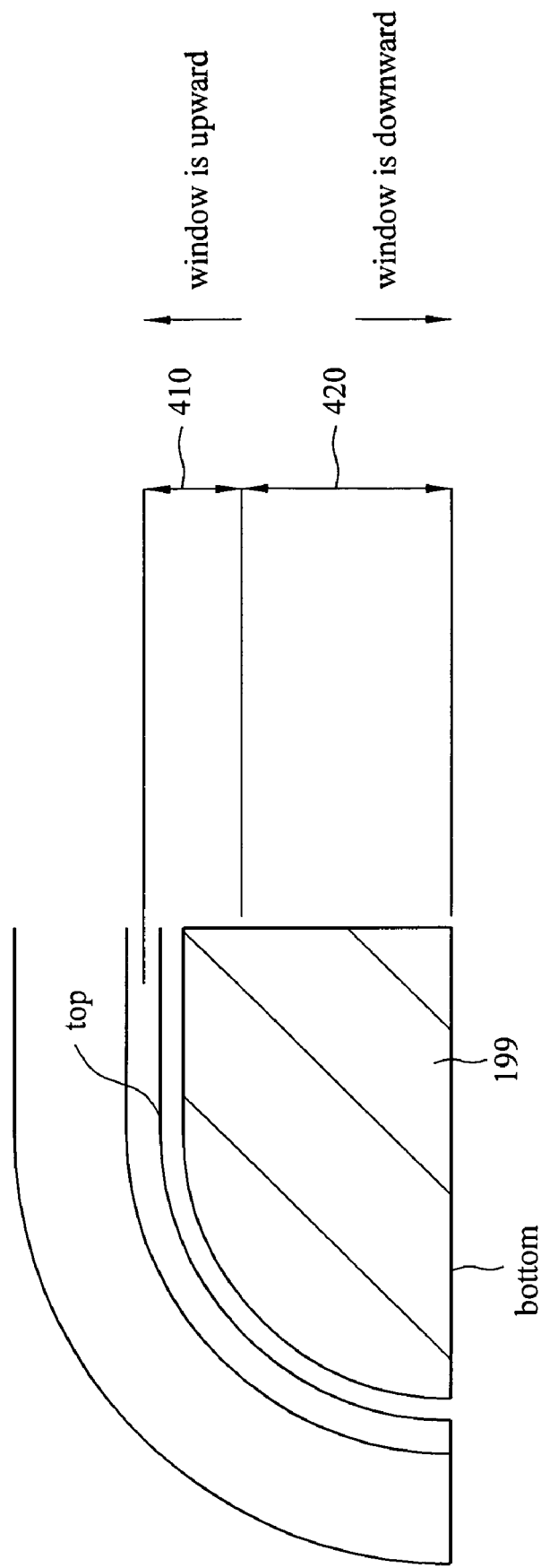
FIG. 4 illustrates the anti-trap zone according to one preferred embodiment of this invention.

FIG. 4 illustrates the anti-trap zone according to one preferred embodiment of this invention. The window 199 can be moved between the top and the bottom, and the movable zone can be divided into an anti-trap zone 410 and a non anti-trap zone 420. Users can decide the size of the anti-trap zone 410 according to their requirements.

Figure 5:
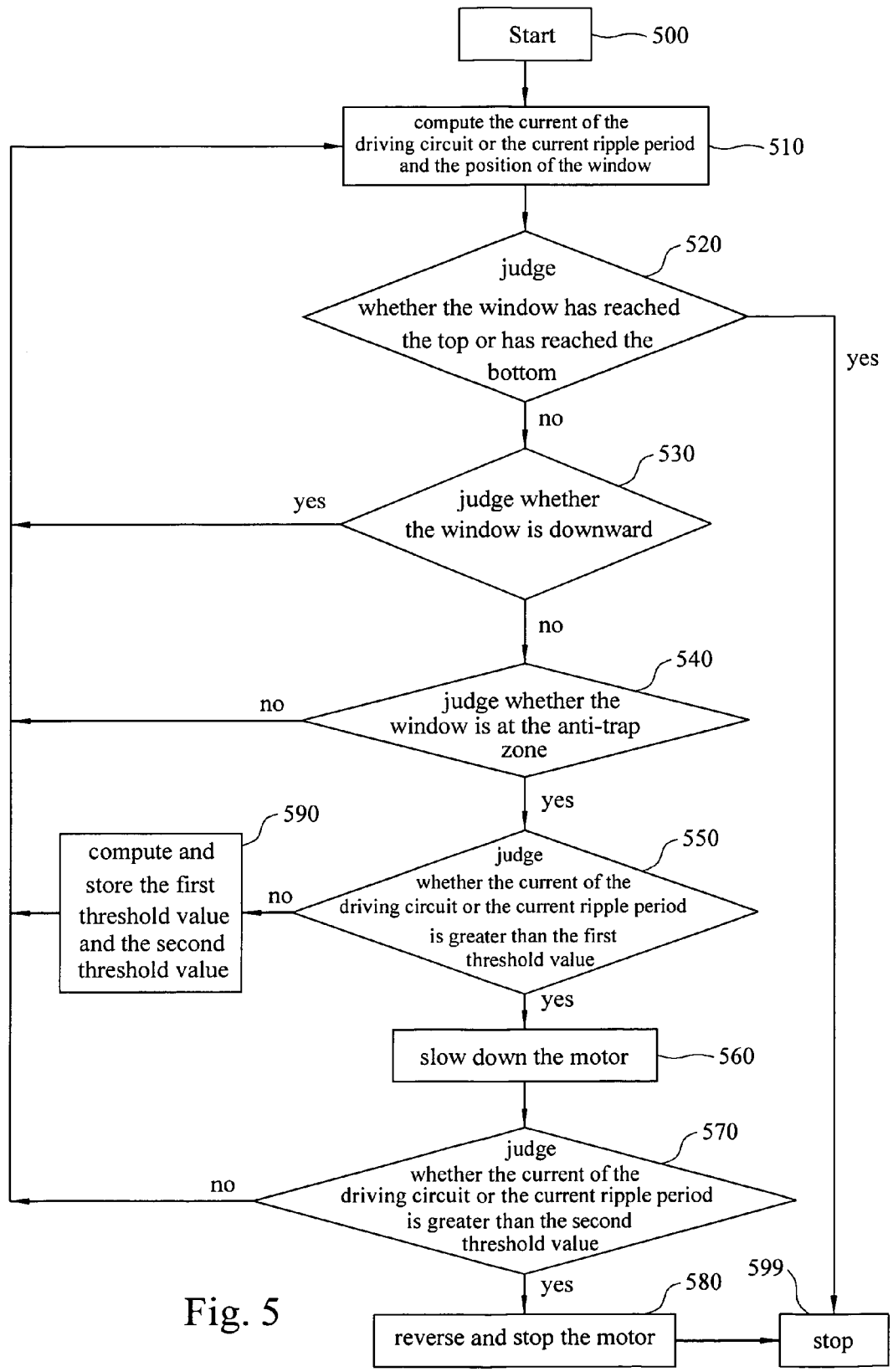
FIG. 5 is the flow chart of a method to operate an automatic anti-trap device according to one preferred embodiment of this invention.

FIG. 5 is a flow chart of a method to operate an automatic anti-trap device according to one preferred embodiment of this invention. Referring also to FIG. 3, the method of this embodiment first starts to move the window (step 500). Then, the micro processor 350 computes a current of the driving circuit 130 or a period of current ripple and the position of the window 199 (step 510) and judges whether the current of the driving circuit 130 or the period of current ripple is greater than the first threshold value (step 550). When the current of the driving circuit 130 or the period of current ripple is greater than the first threshold value, whether the current of the driving circuit 130 or the period of current ripple is greater than the second threshold value is judged (step 570), wherein the second threshold value is greater than the first threshold value. When the current of the driving circuit 130 or the period of current ripple is greater than the second threshold value, the window 199 is stopped from moving (step 599).

The method further comprises a step after step 510 to judge whether the upward window 199 has reached the top or whether the downward window 199 has reached the bottom (step 520). When the upward window 199 is at the top or the downward window 199 is at the bottom, the method executes step 599 to stop moving the window 199. When the window 199 is not at the top and not at the bottom, the method further comprises a step to judge whether the window 199 is downward (step 530). When the window 199 is downward, the method continues to move the window 199 downward and execute step 510. When the window 199 is not downward, the method further comprises a step to judge whether the window 199 is at an anti-trap zone (step 540). When the window 199 is at the anti-trap zone, the method executes step 550. When the window 199 is not at the anti-trap zone, the method executes step 510.

In step 550, when the current of the driving circuit 130 or the period of ripple period is greater than the first threshold value, the method further comprises a step before step 570 to slow down the motor 110 (step 560). In step 550, when the current of the driving circuit 130 is not greater than the first threshold value, the method further comprises a step to re-compute and update the first threshold value and the second threshold value (step 590) according to the current of the driving circuit 130 or the period of current ripple, and then execute step 510. In step 570, when the current of the driving circuit 130 or the period of current ripple is greater than the second threshold value, the method further comprises a step before step 599 for reversing and stopping the motor 110 (step 580) to reverse the window 199 for a preset distance or to a preset position. In step 570, when the current of the driving circuit 130 or the period of current ripple is not greater than the second threshold value, the method executes step 510.

In some embodiments, there is no anti-trap zone (step 540). Therefore, after the step to judge whether the window is downward (step 530), when the window 199 is not downward, directly judges whether the current of the driving circuit 130 or the period of current ripple is greater than the first threshold value (step 550).

Although the present invention has been described in considerable detail with reference to certain preferred embodiments thereof, other embodiments are possible. Therefore, the spirit and scope of the appended claims should not be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An automatic anti-trap device, comprising:
   a motor;
   a driving circuit coupling to the motor used to control the motor;
   a current sensor coupling to the driving circuit used to detect a current signal;
   a current ripple peak value circuit coupling to the current sensor used to generate a current ripple peak value signal according to the current signal; and
   a micro processor used to store data, judge whether the automatic anti-trap device traps an object according to a keystroke signal, the current signal and the current ripple peak value signal, and generate a working signal for the driving circuit to control the motor.

2. The automatic anti-trap device of claim 1, further comprising a transmission coupling to the motor, wherein the transmission is used to move a window.

3. The automatic anti-trap device of claim 2, wherein the micro processor computes a position of the window according to the current ripple peak value signal.

4. The automatic anti-trap device of claim 3, wherein the micro processor judges whether the window is at an anti-trap zone and generates the working signal according to the position of the window and the current signal.

5. The automatic anti-strap device of claim 1, wherein when the current signal is analog type, further comprising an analog to digital converter, wherein the analog to digital converter is used to transform an analog signal into a digital signal for the micro processor.

6. The automatic anti-trap device of claim 1, further comprising a memory, wherein the memory is used to store the processed data of the micro processor.

7. The automatic anti-trap device of claim 1, further comprising at least one filter in the current ripple peak value circuit to eliminate the noise of the current ripple peak value signal, wherein the filter is a high pass filter, a low pass filter, a band pass filter, a band rejection filter or a notch filter.

8. The automatic anti-trap device of claim 7, wherein the high pass filter is arranged to eliminate the influence of the rush start-up generated by the motor.

9. The automatic anti-trap device of claim 1, further comprising a hysteretic comparator in the current ripple peak value circuit to eliminate the noise of the current ripple peak value signal.

10. The automatic anti-trap device of claim 1, further comprising a signal amplifier in the current ripple peak value circuit to control the amplitude of the current ripple peak value signal in acceptable range.

11. The automatic anti-trap device of claim 1, further comprising a signal attenuator in the current ripple peak value circuit to control the amplitude of the current ripple peak value signal in acceptable range.

12. The automatic anti-trap device of claim 5, further comprising a current level loop connected between the current sensor and the analog to digital converter, wherein the current level loop is arranged to control the amplitude of the current signal in acceptable range.

13. The automatic anti-trap device of claim 12, wherein the current level loop comprises an amplifier to control an inside signal of the current level loop in acceptable range.

14. The anti-trap device of claim 12, wherein the current level loop comprises at least one filter to eliminate the noise of the current signal, wherein the filter is a band pass filter or a notch filter.

15. The automatic anti-trap device of claim 12, wherein the current level loop comprises a temperature compensation loop to eliminate the influence of the temperature.

* * * * *